United States Patent [19]
Birchak et al.

[11] Patent Number: 5,644,186
[45] Date of Patent: Jul. 1, 1997

[54] ACOUSTIC TRANSDUCER FOR LWD TOOL

[75] Inventors: James Robert Birchak, Spring; Eugene Linyaev, Houston; Carl Arthur Robbins, Tomball; Dennis E. Roessler, Houston, all of Tex.

[73] Assignee: Halliburton Company, Houston, Tex.

[21] Appl. No.: 483,112

[22] Filed: Jun. 7, 1995

[51] Int. Cl.⁶ .................................................. H01L 41/08
[52] U.S. Cl. ........................ 310/337; 310/344; 310/346
[58] Field of Search .................................. 310/338, 339, 310/344, 346, 334–337, 328

[56] References Cited

U.S. PATENT DOCUMENTS

| | | | |
|---|---|---|---|
| 3,213,415 | 10/1965 | Moser et al. | 340/17 |
| 4,069,433 | 1/1978 | McShane | 310/325 |
| 4,450,540 | 5/1984 | Mallett | 367/41 |
| 4,493,062 | 1/1985 | Mallett | 367/32 |
| 4,928,031 | 5/1990 | Linyaev et al. | 310/346 |
| 4,976,259 | 12/1990 | Higson et al. | 128/200.18 |
| 5,317,111 | 5/1994 | Orban et al. | 181/105 |
| 5,319,965 | 6/1994 | Lynch et al. | 73/152.02 |
| 5,389,848 | 2/1995 | Trzaskos | 310/322 |

Primary Examiner—Mark O. Budd
Attorney, Agent, or Firm—Gilbreth & Strozier, P.C.; J. M. (Mark) Gilbreth; Robert W. Strozier

[57] ABSTRACT

A transducer and a receiver for use in logging-while-drilling operations, having internal pressure adjustment mechanisms to equalize the pressure between the interior of the transducer or receiver, and the well fluids.

1 Claim, 5 Drawing Sheets

5,644,186

ACOUSTIC TRANSDUCER FOR LWD TOOL

BACKGROUND OF THE INVENTION

1. Field of the Invention

The present invention relates to transducers and to tools utilizing such transducers. In another aspect, the present invention relates to acoustic transducers for use in logging-while-drilling tools ("LWD") having such transducers. In even another aspect, the present invention relates to acoustic transducers having integral pressure stabilization, and to tools utilizing such transducers.

2. Description of the Related Art

In general, the apparatus for making an acoustic log consists of a transmitter capable of providing acoustical impulses, and at least one receiver responsive to acoustical energy, both mounted on a support for movement through the length of the well bore. The transmitter and receiver are spaced apart by a fixed distance and as the support is moved through the well bore, the energy from acoustic pulses periodically generated by the transmitter is picked up at the receiver after transmission through the well bore. The amplitudes of the received signals are correlated with the depth in the well bore to provide a log indicating the qualities of the cement bonding to the bore over the length of the well.

The acoustic transmitter and receivers employed for these purposes usually comprise a piezoelectric or magnetostrictive element which, in the case of a transmitter, is actuated by an electrical impulse to generate an acoustic wave and which, in the case of the receiver, is responsive to acoustical energy impinging theron to generate an electrical impulse to generate an acoustic wave and which, in the case of the receiver, is responsive to acoustical energy impinging thereon to generate an electrical signal generally proportional to the intensity of the acoustic energy.

For effective operation of these components, it is necessary that they be both efficiently coupled to the surrounding media and at the same time carefully protected from the deleterious effects of the liquids and gases present in well bores or casing.

These requirements present problems, especially in view of the temperature and pressure variation encountered as the apparatus moved through different levels in the well bore. The apparatus must not only be impervious to the well pressures, but must also avoid affecting the acoustic properties thereof.

Flexible elastomer covers have been utiized to enclose transducer elements in an oil. While these covers were liquid tight, they did not prevent gases in the borehole fluid from permeating under the high pressures encountered and having, the gases go into solution in the oil. Hence, when the logging tool was withdrawn from the wellbore, the gases could not leave at a rate adequate to prevent bursting of the cover. Moreover, earlier types of logging tools were difficult to repair by virtue of the techniques employed to seal them against well fluids and to equalize them against well fluids and to equalize interior and exterior pressures.

U.S. Pat. No. 3,213,415, issued Oct. 19, 1965 to Moser et al., discloses a pressure equalizing arrangement for acoustic logging, in which the well tool includes a central supporting mandrel around which the transducer element is mounted to provide an annular cavity therebetween. The cavity is completely filled with an electrically non-conductive liquid such as silicone oil which is also relatively compressible. For effective operation of the transducer element, it is necessary that the pressure in the transducer cavity be equalized with the pressure of the wellbore fluids. Bellows means are provided in communication with both the wellbore fluids and the oil-filled cavity, such that the external pressures are communicated to the oil in the cavity, thereby maintaining both the internal and external pressures substantially equal.

This type of pressure equalizing arrangement of utilizing an oil filled cavity in the tool into which each of the transducers are positioned is still in use today.

One of the major drawbacks of such a system is the maintenance problems. Specifically, removal of any of the transducers, for example for servicing or repair, causes some of the oil to leak from the system, and as such, draws air into the oil system. As a hydraulic system, this oil must then be "bled" from the system, and oil refilled. The operation of bleeding air from the oil system and refilling, will easily consume three, four or more hours.

Thus, there is a need in the art for an improved system for equalizing pressure between the wellbore fluids and the transducer cavity.

These and other needs in the art will become apparent to those of skill in the art upon review of this patent specification, including its drawings and claims.

SUMMARY OF THE INVENTION

It is an object of the present invention to provide for an improved system for equalizing pressure between the wellbore fluids and the transducer cavity.

These and other objects of the present invention will become apparent to those of skill in the art upon review of this patent specification, including its drawings and claims.

According to one embodiment of the present invention there is provided a transducer. The transducer first includes casing having a recess, and having electrical contacts on an outer part of the casing extending through to the recess. The transducer also includes a piezo electric housing comprising a piezoeletric member therein, and comprising electrical contacts on an outer part of the housing extending through to the piezoelectric member, wherein the housing resides within the recess forming an annular space between the housing and the casing, and wherein the housing and casing electrical contacts are connectably engaged. The transducer even also incudes a compressible liquid residing within the annular space. The transmitter also includes an annularly shaped seal assembly within the annular space, positioned to retain the compressible liquid within the annular space, wherein the seal assembly is additionally slidably positioned within the annular space between first and second positions.

DETAILED DESCRIPTION OF THE INVENTION

Figures 1, 2:
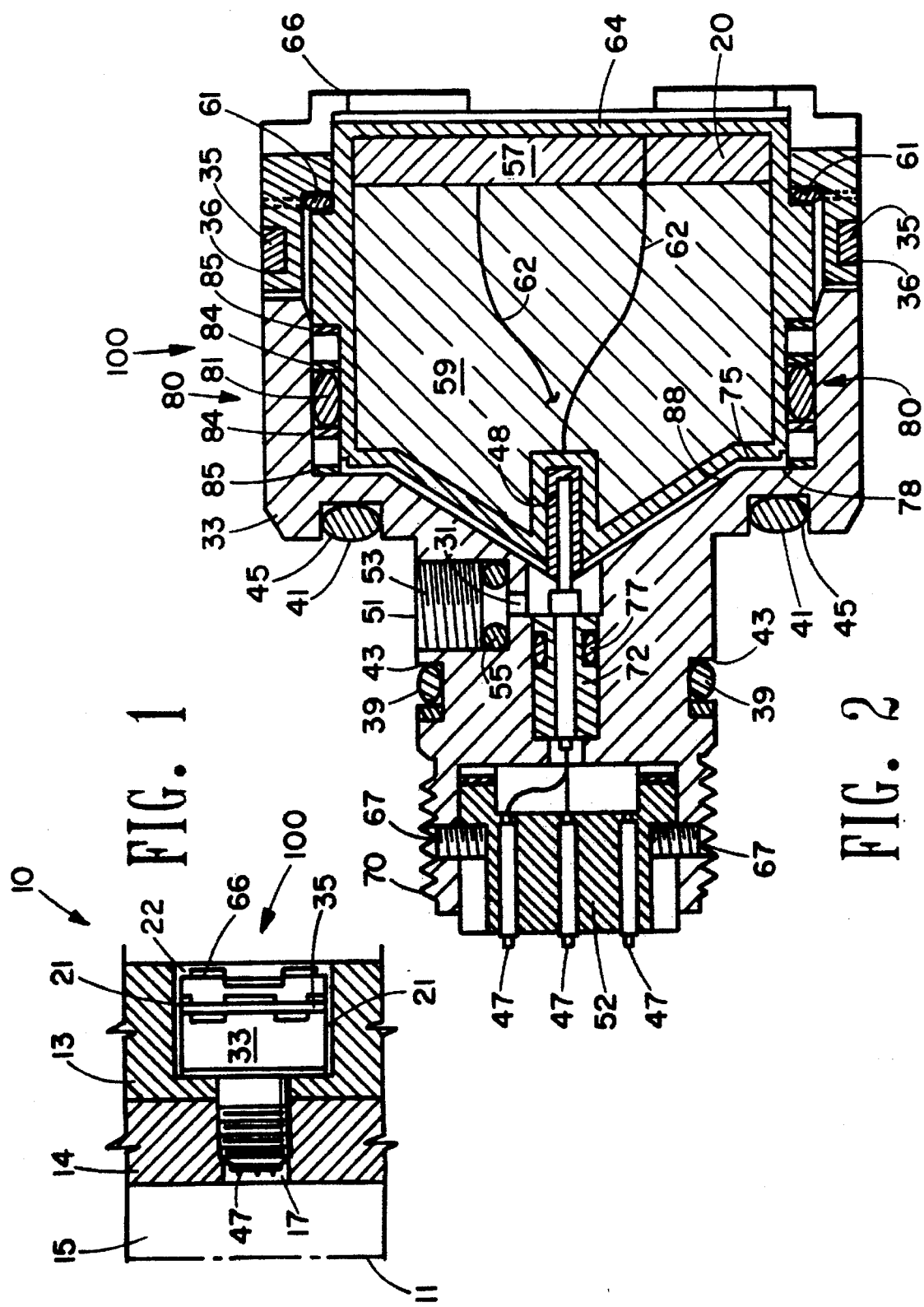
FIG. 1 is cross-sectional view through well tool 10 showing a side-view of transducer 100 positioned within recess 22 of well tool 10, with tool 10 having collar 13 electronics sub 14, and and electronics sub connector 17.
FIG. 2 is shown a cross-sectional view of transducer 100 showing ceramic disk 57, which is encased within epoxy casing 64, which is in turn housed in stainless steel housing 33, and showing seal assembly 80 of the present invention.

The present invention is best understood by reference to FIGS. 1 through 7. Referring first to FIG. 1 there is shown a cross-sectional view through well tool 10 showing a side-view of transducer 100 positioned within well tool 10. Tool 10 is shown in partial view, with center line 11 and tool body 12 having collar 13, electronics sub 14, and electronics sub connector 271.

Passage 15 traverses the center of the tool carrying drilling mud. Transducer 100 is positioned within recess 22 of collar 13. Recess 22 is shaped substantially similar to transducer, only slightly larger than transducer 100, thus forming annular passage 21 between them. Positioned to seal passage 21 is o-ring 41 (shown in later FIGS.), which serves to separate the mud within passage 15 from the mud in the well bore.

Transducer electrical leads 47 engage electronics sub connector 17 and is thus connected to the electronics of tool 10. The electronics sub 14 is physically isolated from fluid in passage 15, and carries the electronics associated with tool 10. Wellbore mud is kept out the electronics sub 14 by O-ring 39 (shown in later FIGS.). Thus, this connection between electrical leads 47 and connector 17 is made in an air environment, isolated from both the fluid in passage 15 and the wellbore fluids.

Referring additionally to FIG. 2, there is shown a cross-sectional view of transducer 100 showing ceramic disk 57, which is encased within epoxy casing 64, which is in turn housed in stainless steel housing 33, and showing seal assembly 80 of the present invention.

The ceramic disk 57 is fabricated of material characterized by low sonic impedance and high internal damping. Lead metaniobate ceramic polarized over its entire surface is preferred. When an electrical voltage is applied across its outer and inner flat surfaces, the thickness of the ceramic disk changes slightly. When the impressed voltage is removed, the ceramic disk returns to its original thickness. If the ceramic disk has an oscillating voltage of a certain time length, here called a pulse, the ceramic disk oscillates. An acoustic pulse is emitted from the disk because of the oscillating thickness of the ceramic disk changes in response to the oscillating voltage.

With no voltage on the disk, it serves as a receiver. In a pulse-echo sensor or transceiver, i.e., the ceramic disk 57, is used to emit an acoustic pulse and receive an echo of the emitted pulse and produce an electrical signal in response thereto.

The backing member 59 preferably has a sonic impedance approximately the same as the material of the ceramic disk 57. Accordingly, little acoustic energy is reflected back toward the ceramic disk 57 as it meets the interface between ceramic disk 57 and backing member 59. On the other hand, the backing member 59 should have high sonic attenuation so that energy into the backing is quickly attenuated as it travels backward into the backing element and bounces from its extremities. It is important that the backing element be fabricated of a material which maintains its properties of high acoustic attenuation and ceramic matching impedance under conditions of high pressure and high temperature. Materials suitable for backing member 59 includes rubber blended with tungsten powder.

Epoxy casing 64 encloses a sensor stack comprising piezo-electric element 57 and backing 59, which cooperate to generate or emit an ultra-sonic pulse or to receive sonic echo pulses. Being enclosed in epoxy, casing 64 isolates the sensor stack from high pressure drilling fluid in the borehole. Such fluid isolation avoids electrical shorting and corrosion of the sensor stack.

This epoxy casing 64 is mounted within metal cup 33, where it is held in place by retaining cap 66 and retaining ring 35, which is positioned within retaining ring slot 36 running along on both cup 33 and cap 66.

Electrical connections are made between ceramic member 57, wires 62, epoxy casing contacts 48, feed through 72, and spring loaded electrical contactors 47 in contact block 52, all of which are well known in the art. An o-ring 77 is utilized around feed through 72 to keep pressure stabilizer fluid in passage 88 away from connectors 47.

Positioned to seal passage 21 (as shown in FIG. 1) is o-ring 41 placed within o-ring seat 45 in casing 33, which serves to separate the mud within passage 15 from the mud in the well bore. Wellbore mud is kept out the electronics sub 14 (as shown in FIG. 1) by O-ring 39 positioned within seat 43. Threads 70 are utilized to keep transducer 100 attached to electronics sub 14. Set screws 67 are utilized to assist in locating contacts within the housing.

Figure 3:
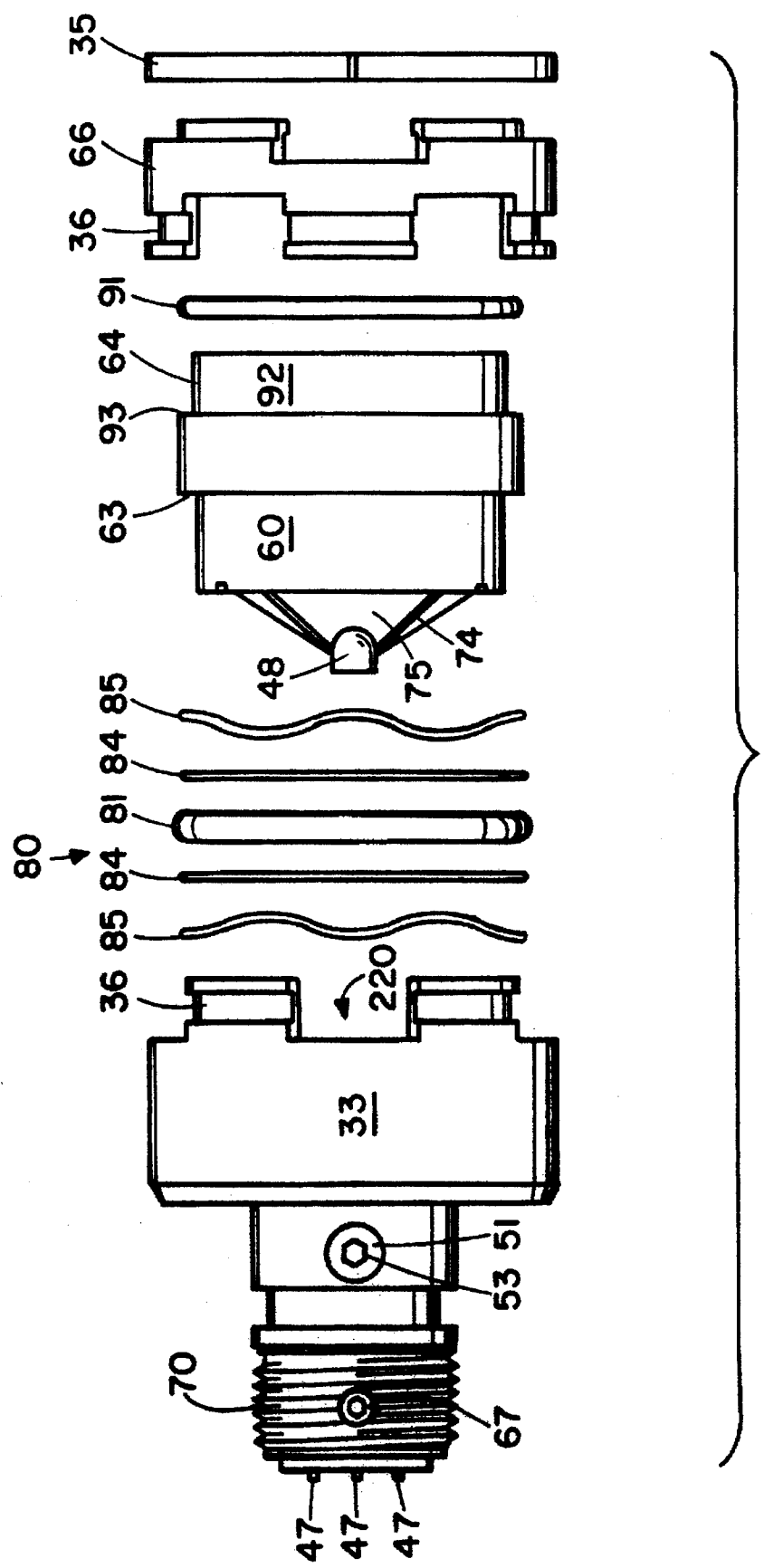
FIG. 3 is an exploded side view of transducer 100 of the present invention, showing stainless steel housing 33, seal assembly 80, epoxy casing 64 and retaining cap 66.

Referring additionally to FIG. 3 there is shown an exploded side view of transducer 100 of the present invention, showing stainless steel housing 33, seal assembly 80, epoxy casing 64 and retaining cap 66.

In assembly, the annular members of seal assembly 80 are placed onto seal surface 60 of epoxy member 64, where they will abut against shoulder 63 of epoxy member 64. Annularly shaped elastomeric spring member 91 is placed onto surface 92 of epoxy member 64, where it will abut against shoulder 93. The epoxy member 64 having seal assembly 80 and spring member 91 inserted thereon, is then inserted into steel casing 33 with the epoxy casing contacts 48 engaged with electrical module 72.

Retaining cap 66 is then interlocked with steel casing 33. Elastomeric spring member 91 prevents retaining cap 66 from contacting epoxy housing 64. Thus, retaining cap 66 and steel casing 33 are compressed together sufficiently to deform elastomeric spring member 91 and allow for insertion of annularly shaped split retaining ring 35 into grooves 36.

Figure 4:
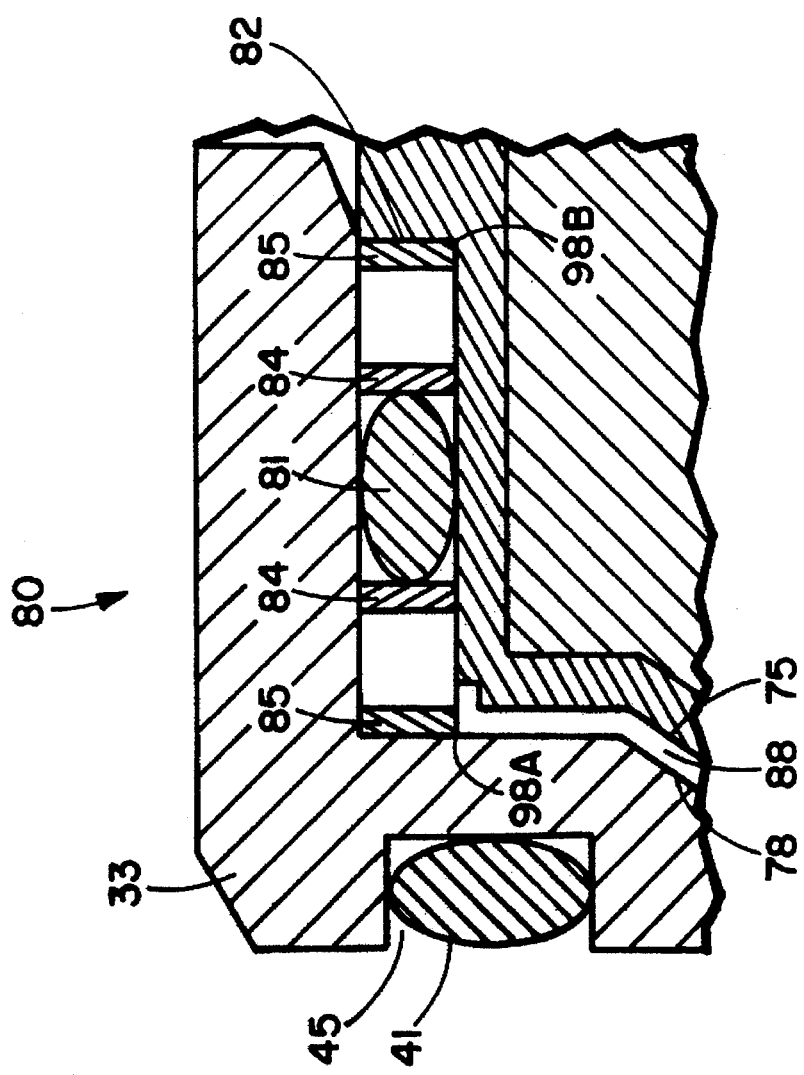
FIG. 4 is an enlarged view of seal assembly 80 of FIG. 2, and shows the multiplicity of annularly shaped members of seal assembly 80, including o-ring seal member 81, backing members 84, and wavy washers 85, all retained within seal bore 82, and further showing a passage 88 formed between bottom face 75 of epoxy casing 64, and upper face 78 of steel casing 33.

Referring additionally to FIG. 4, there is shown an enlarged view of seal assembly 80 from FIG. 2. Seal assembly 80 includes a multiplicity of annularly shaped members, including o-ring seal member 81, backing members 84, and wavy washers 85, all retained within seal bore 82. A passage 88 is formed between bottom face 75 of epoxy casing 64, and upper face 78 of steel casing 33. This passage 88 is essentially comprised of fluid passage grooves 74, although there may be some clearance between faces 75 and 78. Seal bore 82 serves to transmit pressure between passage 88 and the well bore. Seal assembly 80 forms a barrier to fluids between passage 88 and the well bore.

Passage 88 is normally filled with a compressible fluid, generally an oil. This compressible liquid is placed into passage 88 utilizing port 51, which is in liquid communication with passage 88 via passage 31. Care must be taken to remove substantially all air from within passage 88 prior to operation and use of transducer 100. Oil is retained in passage 88 utilizing sealing screw 53 and o-ring seal 55.

Passage 88 will be described in more detail by referring additionally to FIG. 5 and FIG. 7.

Figure 5:
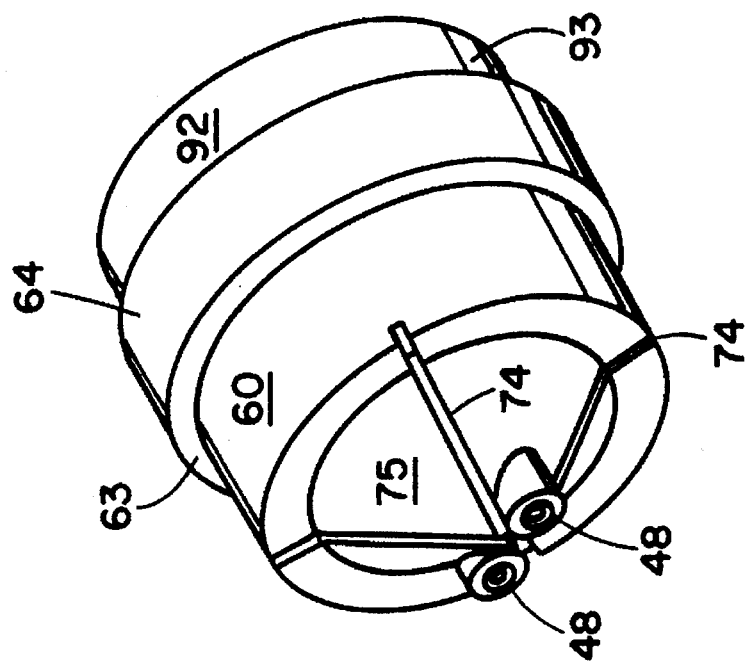
FIG. 5 is an illustration showing epoxy housing 64 with seal assembly surface 60 and shoulder 63, surface 92 and elastomeric spring seat shoulder 93, bottom surface 75, and electrical connectors 48.

FIG. 5 is an illustration showing epoxy housing 64 with seal assembly surface 60 and shoulder 63, surface 92 and elastomeric spring seat 93, bottom surface 75, fluid passages 74 and electrical connectors 48.

Figure 7:
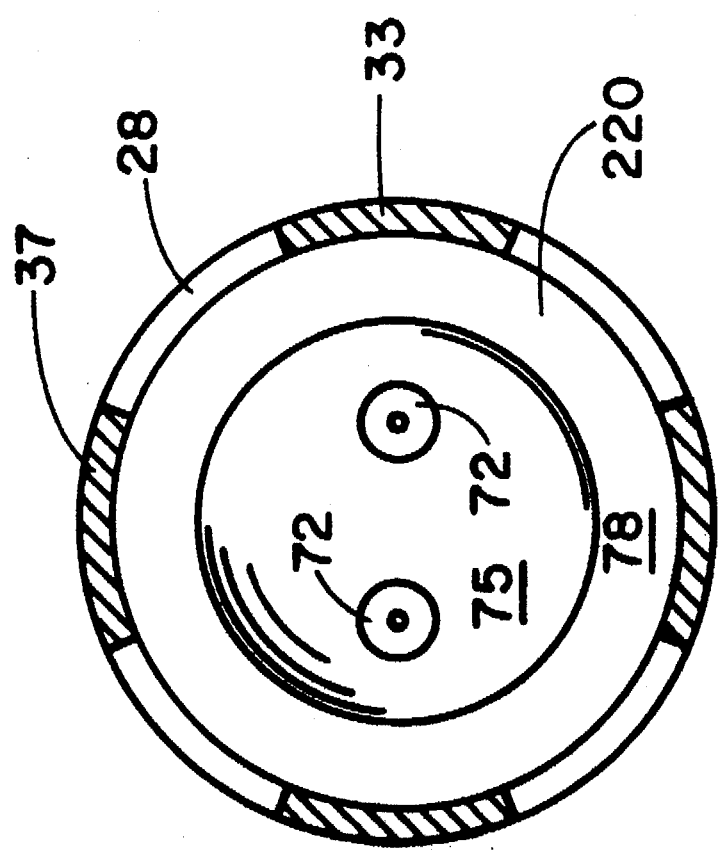
FIG. 7 is a top view of steel casing 33, showing recess 22, receiving surface 78, and electrical connectors 72 for connection with electrical connectors 48.

FIG. 7 is a top view of steel casing 33, showing recess 220 for receiving epoxy housing 64, receiving surface 78, and feed through 72 for connection with electrical connectors 48. Receiving surface 78 and bottom surface 75 are mating surfaces, which will abut or nearly abut once epoxy housing 64 is placed within recess 220 and thus form fluid passage. Fluid passages 74 are provided in the event that receiving surface 78 and bottom surface 75 are in substantial abutment, to provide for flow of the compressible fluid.

Once transducer 100 is assembled, passage 88 is completely isolated from direct fluid contact with the well environment, with the compressible fluid retained within passage 88 by the seal assembly 80 and o-ring seal 77 placed annularly around each feed though 72.

Seal assembly is in pressure contact with the well bore, and serves to equalize the pressure within transducer 100 with the pressure of the well bore fluid. The wavy washers 85 allow for some compression within seal assembly 80. Additionally, seal assembly 80 will also tend to move between ends 98A and 98B as the pressure dictates. This movement between first position 98A and second position 98B translates the pressure between the well bore and the compressible fluid within passage 88. For example, as the well bore fluid pressure increases, the annular members of seal assembly 80 will tend to move away from the well bore and thus increase the liquid pressure within passage 88. As the well bore fluid pressure decreases, the annular members of seal assembly 80 will tend to move toward the well bore, and thus decrease the liquid pressure within passage 88. Thus, with seal assembly slideably positioned within seal bore 80, it is able to stabilize pressure between the interior of transducer 100 and the well bore fluid.

Figure 6:
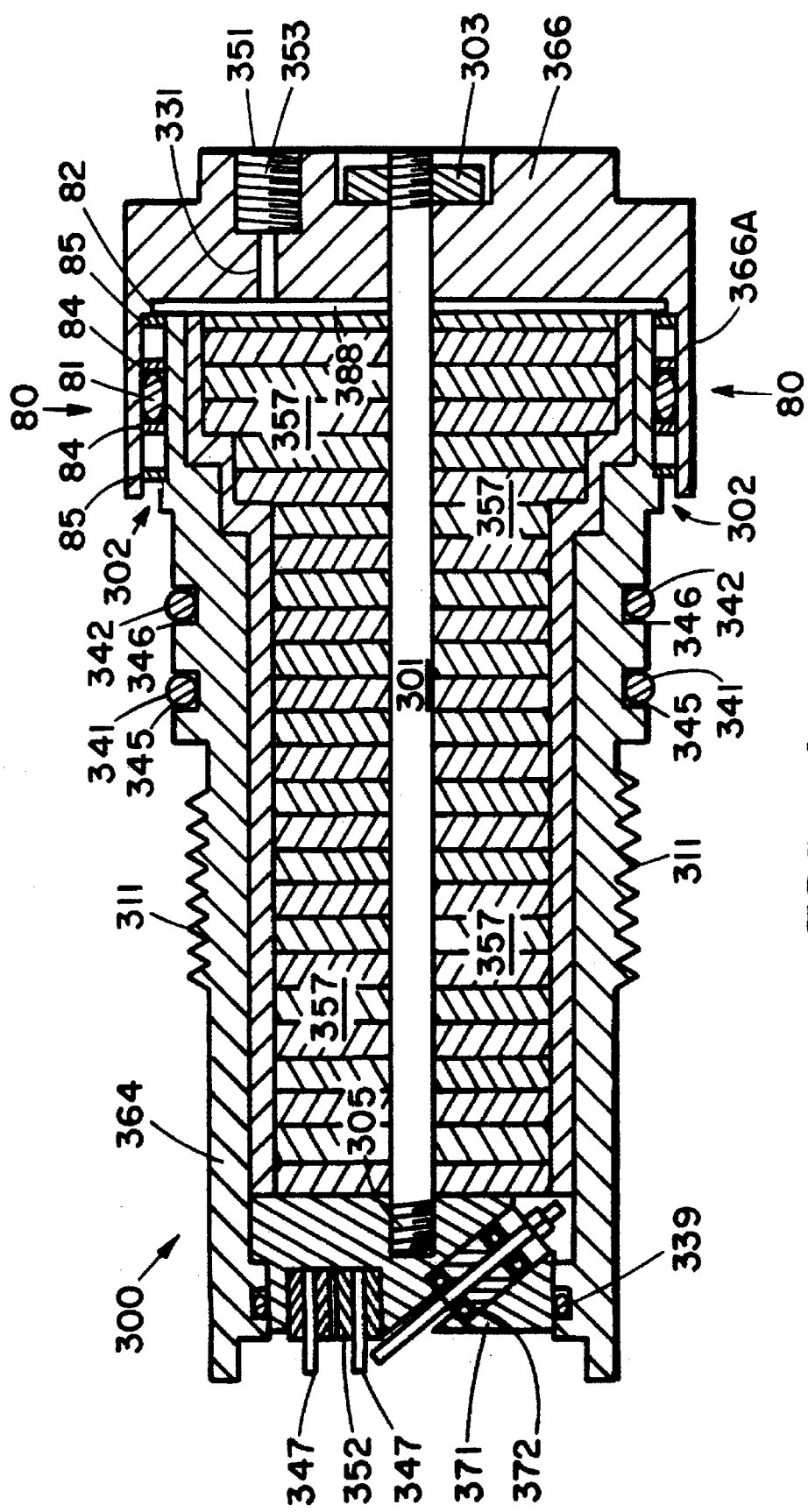
FIG. 6 is is a cross-sectional view of receiver 300 having seal assembly 80 of the present invention.

While the present invention has been illustrated with respect to a transducer 100, the present invention may also be advantageously applied to a transmitter. Referring now to FIG. 6 there is shown another embodiment of the present invention. FIG. 6 shows a cross-sectional view of piezoelectric transmitter 300, having a multiplicity of annularly shaped ceramic disk members 357, held together by rod 301 passing though the middle of disk members 357. Electrical connectors 347 and feed throughs 372 complete the connection with the ceramic disks 357. Other main features of transmitter 300 include threads 311 for securing transmitter 300 to tool 10, and include o-ring seals 341 and 342, positioned within seal grooves 345 and 346, respectively, which provide a barrier between the well fluids and the interior of electronics sub 14.

This stack of ceramic members 357 is positioned within steel casing 364. Seal bore 80 is formed between the body of steel casing 364 and extension 366A of cap 366. Rod 301 extends from electrical assembly 371 into which it is secured, to cap 366. A fastener 303 on rod 301 secures cap 366 to rod 301 and thus to casing 364.

To help stabilize the internal pressure of transmitter 300 and the well bore fluid, seal assembly 80, and compressible liquid passage 388 are provided. Compressible fluid resides in passage 388 which is in pressure connectively with seal assembly 80.

Seal assembly 80 is as described above for transducer 100, and comprises o-ring seal member 81, backing members 84 and wavy washer 85, all residing in seal bore 82.

Passage 388 is is normally filled with a compressible fluid, generally an oil. As shown in FIG. 6, passage is formed between casing 364 and the ceramic stack 357. The compressible liquid is placed into passage 388 utilizing port 351, which is in liquid communication with passage 388 via passage 331. Care must be taken to remove substantially all air from within passage 388 prior to operation and use of transmitter 300. Oil is retained in passage 388 utilizing sealing screw 353 and an o-ring seal.

Once transmitter 300 is assembled, passage 388 is completely isolated from direct fluid contact with the well environment, with the compressible fluid retained within passage 388 by the seal assembly 80 and o-ring seal 339 placed annularly around electrical assembly 371.

Seal assembly 80 is in pressure communication with the well bore, and serves to equalize the pressure within receiver 300 with the pressure of the well bore fluid. Again, the wavy washers 85 allow for some compression within seal assembly 80. Additionally, seal assembly 80 will also tend to move between ends 98A and 98B as the pressure dictates. This movement within the confines of seal bore 82 translates the pressure between the well bore and the compressible fluid within passage 388. For example, as the well bore fluid pressure increases and acts upon seal assembly 80 at arrow 302, the annular members of seal assembly 80 will tend to move away from the well bore and thus increase the liquid pressure within passage 388. As the well bore fluid pressure decreases, the annular members of seal assembly 80 will tend to move toward the well bore, and thus decrease the liquid pressure within passage 388.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled the art to which this invention pertains.

We claim:

1. A transducer comprising:

(a) a casing having a recess, and having electrical contacts on an outer part of the casing extending through to the recess;

(b) a piezo electric housing comprising a piezoeletric member therein, and comprising electrical contacts on an outer part of the housing extending through to the piezoelectric member, wherein the housing resides within the recess forming an annular space between the housing and the casing, and wherein the housing and casing electrical contacts are connectably engaged;

(c) a compressible liquid residing within the annular space;

(d) an annularly shaped seal assembly within the annular space, positioned to retain the compressible liquid within the annular space, wherein the seal assembly is additionally slidably positioned within the annular space between first and second positions.

* * * * *